(12) United States Patent
Raiser

(10) Patent No.: US 7,332,239 B2
(45) Date of Patent: Feb. 19, 2008

(54) COOLANT FLOW TRANSFER COMPONENT FOR LIQUID COOLED FUEL CELL STACKS

(75) Inventor: Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 865 days.

(21) Appl. No.: 10/460,055

(22) Filed: Jun. 12, 2003

(65) Prior Publication Data
US 2004/0253497 A1 Dec. 16, 2004

(51) Int. Cl.
*H01M 2/00* (2006.01)
(52) U.S. Cl. .......................... 429/34; 429/38
(58) Field of Classification Search .................. 429/34, 429/13, 17, 38, 57
See application file for complete search history.

(56) References Cited

U.S. PATENT DOCUMENTS

| | | | | |
|---|---|---|---|---|
| 4,362,789 | A | 12/1982 | Dighe | 429/17 |
| 5,441,821 | A | 8/1995 | Merritt et l. | 429/17 |
| 5,458,095 | A | 10/1995 | Post et al. | 123/3 |
| 5,723,229 | A | 3/1998 | Scheifers et al. | 429/19 |
| 6,015,633 | A | 1/2000 | Carlstrom, Jr. et al. | 429/13 |
| 6,221,523 | B1 | 4/2001 | Chun et al. | 429/40 |
| 6,277,447 | B1 | 8/2001 | Chun et al. | 427/421 |
| 6,280,869 | B1* | 8/2001 | Chen | 429/34 |
| 6,358,640 | B1 | 3/2002 | Kendall et al. | 429/26 |
| 2001/0013321 | A1 | 8/2001 | Knowlton et al. | |
| 2001/0052389 | A1 | 12/2001 | Chun et al. | |
| 2001/0053469 | A1 | 12/2001 | Kobayaski et al. | |
| 2001/0055709 | A1 | 12/2001 | Sang | |
| 2002/0006537 | A1 | 1/2002 | Kobayashi et al. | |
| 2002/0055023 | A1 | 5/2002 | Rueegge et al. | |
| 2002/0081472 | A1 | 6/2002 | Kendall et al. | |
| 2002/0136937 | A1* | 9/2002 | Kelley et al. | 429/17 |

* cited by examiner

*Primary Examiner*—Patrick Joseph Ryan
*Assistant Examiner*—Monique Wills

(57) ABSTRACT

Flow transfer component for liquid cooled fuel cell stacks. The flow transfer component comprises a first inlet/outlet, a second inlet/outlet, and an electrically resistive flow portion. The first inlet/outlet can be dimensioned so as to complement a fluid carrying duct comprising an electrically conductive flow passage. The second inlet/outlet can be dimensioned so as to complement a fuel cell port. At least a segment of the electrically resistive flow portion is positioned between the first inlet/outlet and the second inlet/outlet, and at least a segment can extend into the fluid carrying duct and/or into the fuel cell stack via the fuel cell port. The electrically resistive flow portion defines a flow-path length sufficient to present a substantial electrical resistance across a volume defined by the electrically resistive flow portion. It is emphasized that this abstract is provided to comply with the rules requiring an abstract, which will allow a searcher or other reader to quickly ascertain the subject matter of the technical disclosure. It is submitted with the understanding that it will not be used to interpret or limit the scope or meaning of the claims. 37 C.F.R. §1.72(b).

16 Claims, 5 Drawing Sheets

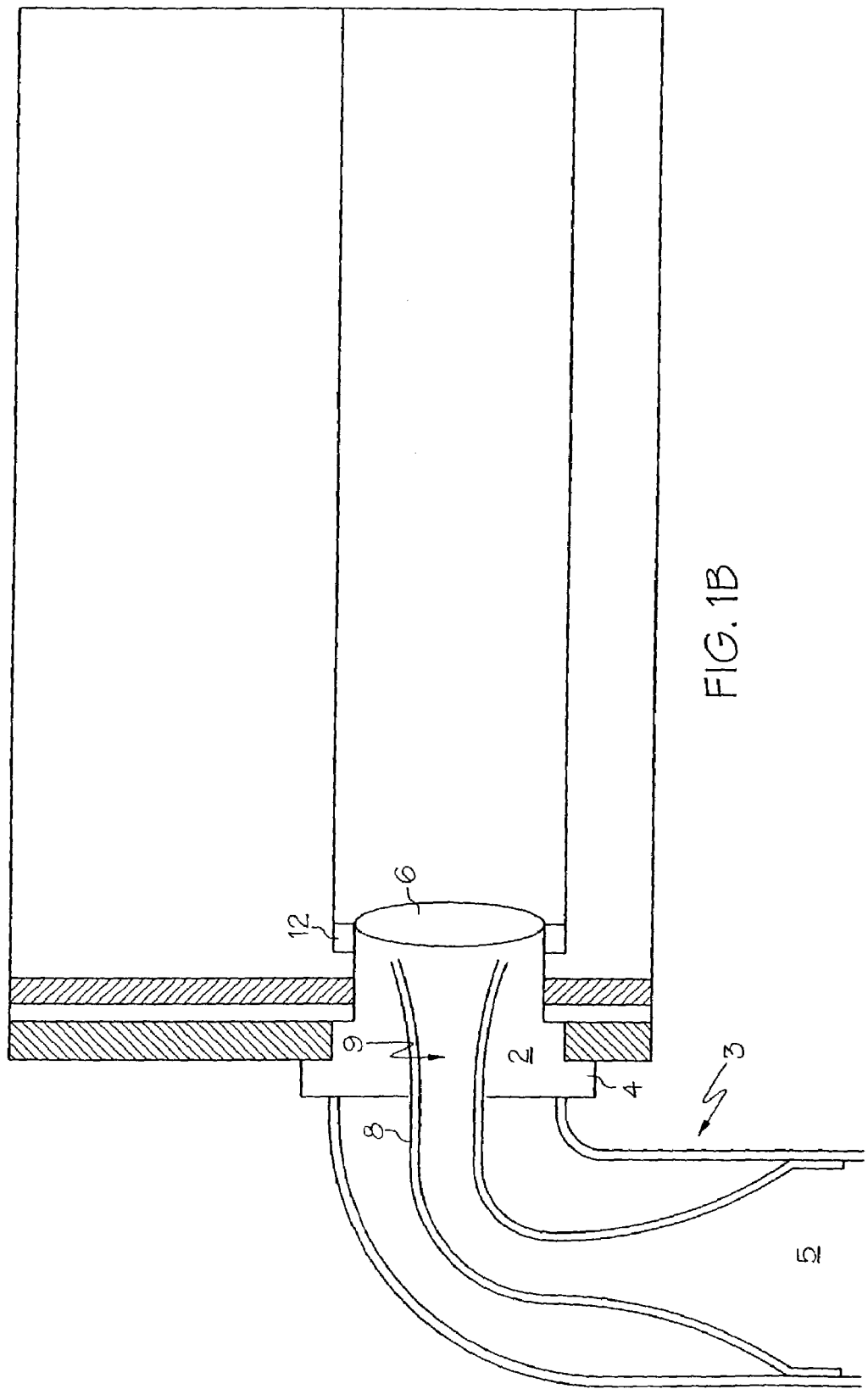

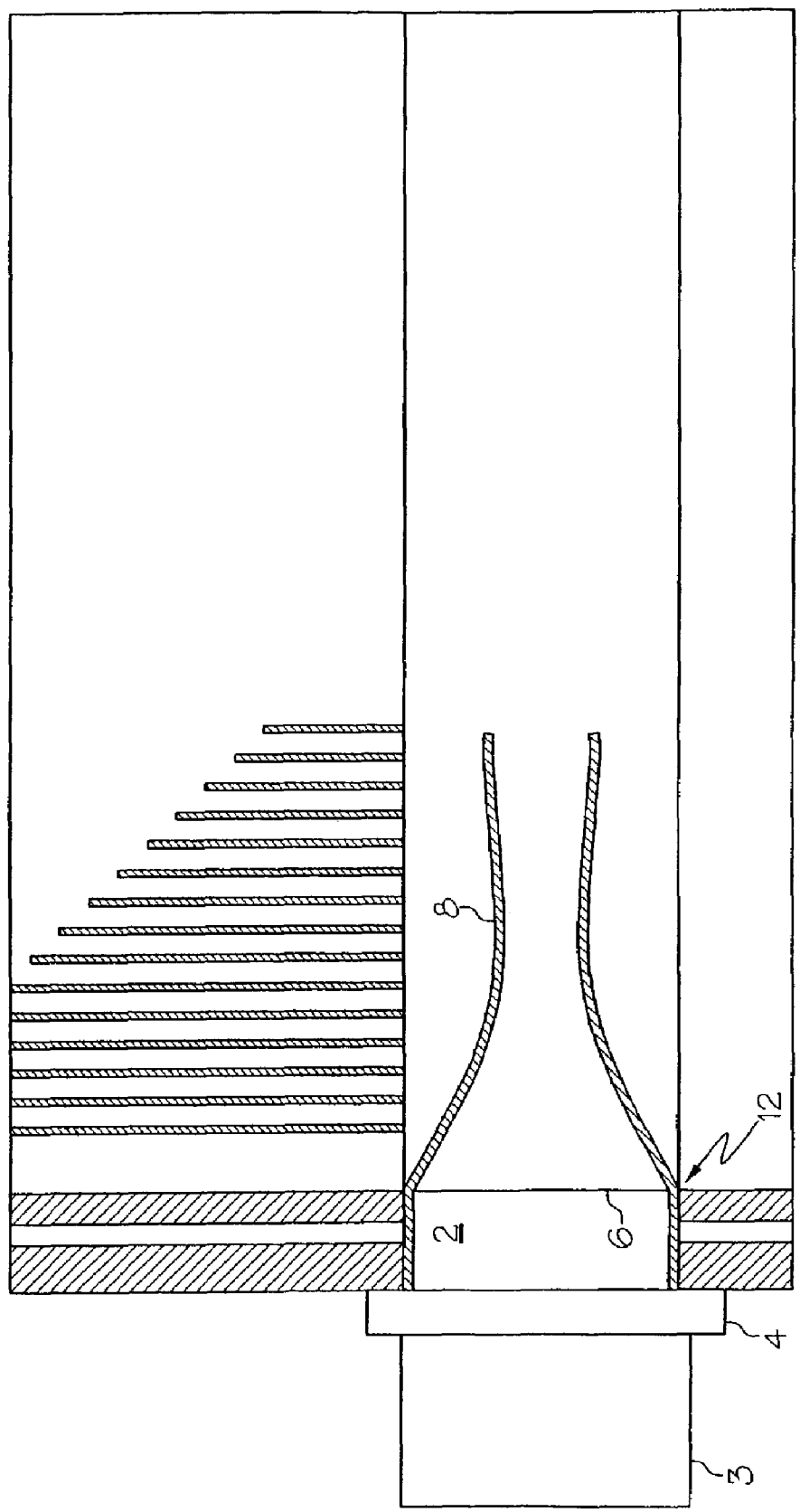

COOLANT FLOW TRANSFER COMPONENT FOR LIQUID COOLED FUEL CELL STACKS

BACKGROUND OF THE INVENTION

The present invention relates generally to liquid cooled fuel cell systems and, more particularly, to a coolant flow transfer component and a fuel cell manifold for liquid cooled fuel cell stacks, each including an electrically resistive flow portion.

SUMMARY OF THE INVENTION

Standard electric vehicle ("EV") safety requirements impose certain challenges on designers and engineers of vehicles employing liquid cooled fuel cell stacks. Although some high impedance is allowed, for example, 500 Ohms/Volt (FMVSS standard), for the most part liquid cooled fuel cell stacks must be electrically isolated from the coolant loop. Designing EVs or FCEVs (fuel cell electric vehicles) with either too low isolation resistance or ignoring the problems associated with electrical isolation can lead to hazardous situations or component damage due to the inability to inherently limit fault currents by high isolation resistances.

Prior to the contemplation of the present invention, electrical isolation of the coolant loop was accomplished by employing non-conductive or dielectric liquids within the coolant loop. However, such non-conductive coolants (e.g., de-ionized water, oil) exhibit significant disadvantages in their physical properties (e.g., heat capacity, heat conductivity, viscosity, environmental constraints, and freezing) compared to combined water and antifreeze-based (e.g., water-glycol) coolants. These disadvantages can adversely affect system power density, radiator size, radiator fan, and/or coolant pump power. Accordingly, the present inventor has recognized a need for improvements in liquid cooled fuel cell systems design.

The present invention meets the above-mentioned need by providing a flow transfer component and a fuel cell manifold, each including an electrically resistive flow portion. Although the present invention is not limited to specific advantages or functionality, it is noted that the flow transfer component is effective in meeting existing EV safety standards without having to resort to the use of non-conductive coolants. The flow transfer component can be incorporated with both a fluid carrying duct and a fuel cell stack. In addition, the present invention can be integrated into an original manifold design, therefore providing a fuel cell stack that represents an inherently safe and isolated system as fault current is inherently limited to safe values by isolation resistance.

In one embodiment of the invention, a fluid carrying duct incorporating a flow transfer component is provided, wherein the fluid carrying duct comprises an electrically conductive flow passage. The flow transfer component comprises a first inlet/outlet, a second inlet/outlet, and an electrically resistive flow portion. The first inlet/outlet is in fluid communication with the fluid carrying duct and the second inlet/outlet is dimensioned so as to complement a fuel cell port. At least a segment of the electrically resistive flow portion is positioned between the first inlet/outlet and the second inlet/outlet, and at least a segment of the electrically resistive flow portion extends into the fluid carrying duct. The electrically resistive flow portion defines a flowpath length sufficient to present a substantial electrical resistance across a volume defined by the electrically resistive flow portion.

In another embodiment of the invention, a fuel cell stack incorporating at least one flow transfer component is provided, wherein the fuel cell stack comprises at least one fuel cell port. The flow transfer component comprises a first inlet/outlet, a second inlet/outlet, and an electrically resistive flow portion. The first inlet/outlet is dimensioned so as to complement a fluid carrying duct and the second inlet/outlet is in fluid communication with the fuel cell port. At least a segment of the electrically resistive flow portion is positioned between the first inlet/outlet and the second inlet/outlet, and at least a segment of the electrically resistive flow portion extends into the fuel cell stack via the fuel cell port. The electrically resistive flow portion defines a flowpath length sufficient to present a substantial electrical resistance across a volume defined by the electrically resistive flow portion.

In still another embodiment of the invention, a flow transfer component is provided comprising a first inlet/outlet, a second inlet/outlet, and an electrically resistive flow portion. The first inlet/outlet is dimensioned so as to complement a fluid carrying duct and the second inlet/outlet is dimensioned so as to complement a fuel cell port. At least a segment of the electrically resistive flow portion is positioned between the first inlet/outlet and the second inlet/outlet, and at least a segment of the electrically resistive flow portion is configured so as to extend into a complementary fluid carrying duct. The electrically resistive flow portion defines a flowpath length sufficient to present a substantial electrical resistance across a volume defined by the electrically resistive flow portion.

In yet another embodiment of the invention, a flow transfer component is provided comprising a first inlet/outlet, a second inlet/outlet, and an electrically resistive flow portion. The first inlet/outlet is dimensioned so as to complement a fluid carrying duct and the second inlet/outlet is dimensioned so as to complement a fuel cell port. At least a segment of the electrically resistive flow portion is positioned between the first inlet/outlet and the second inlet/outlet, and at least a segment of the electrically resistive flow portion is configured so as to extend into a complementary fuel cell port. The electrically resistive flow portion defines a flowpath length sufficient to present a substantial electrical resistance across a volume defined by the electrically resistive flow portion.

In still yet another embodiment of the invention, a fuel cell manifold is provided comprising a plurality of first inlet/outlets, a plurality of second inlet/outlets, and an electrically resistive flow portion. Each first inlet/outlet is dimensioned to enable securement of a fluid carrying duct, and each second inlet/outlet is dimensioned to enable securement of a fuel cell port. The electrically resistive flow portion is positioned between at least one of the plurality of first inlet/outlets and at least one of the plurality of second inlet/outlets. The electrically resistive flow portion defines a flowpath length sufficient to present a substantial electrical resistance across a volume defined by the electrically resistive flow portion.

These and other features and advantages of the invention will be more fully understood from the following detailed description of the invention taken together with the accompanying drawings. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 1B is a schematic, cross-sectional view of a flow transfer component, at least a segment of which is extending into a fluid carrying duct, and which defines an angular flowpath, in accordance with one embodiment of the present invention;

FIG. 2 is a schematic, cross-sectional view of a flow transfer component, at least a segment of which is extending into a fuel cell stack via a fuel cell port in accordance with one embodiment of the present invention;

Figure 1A:
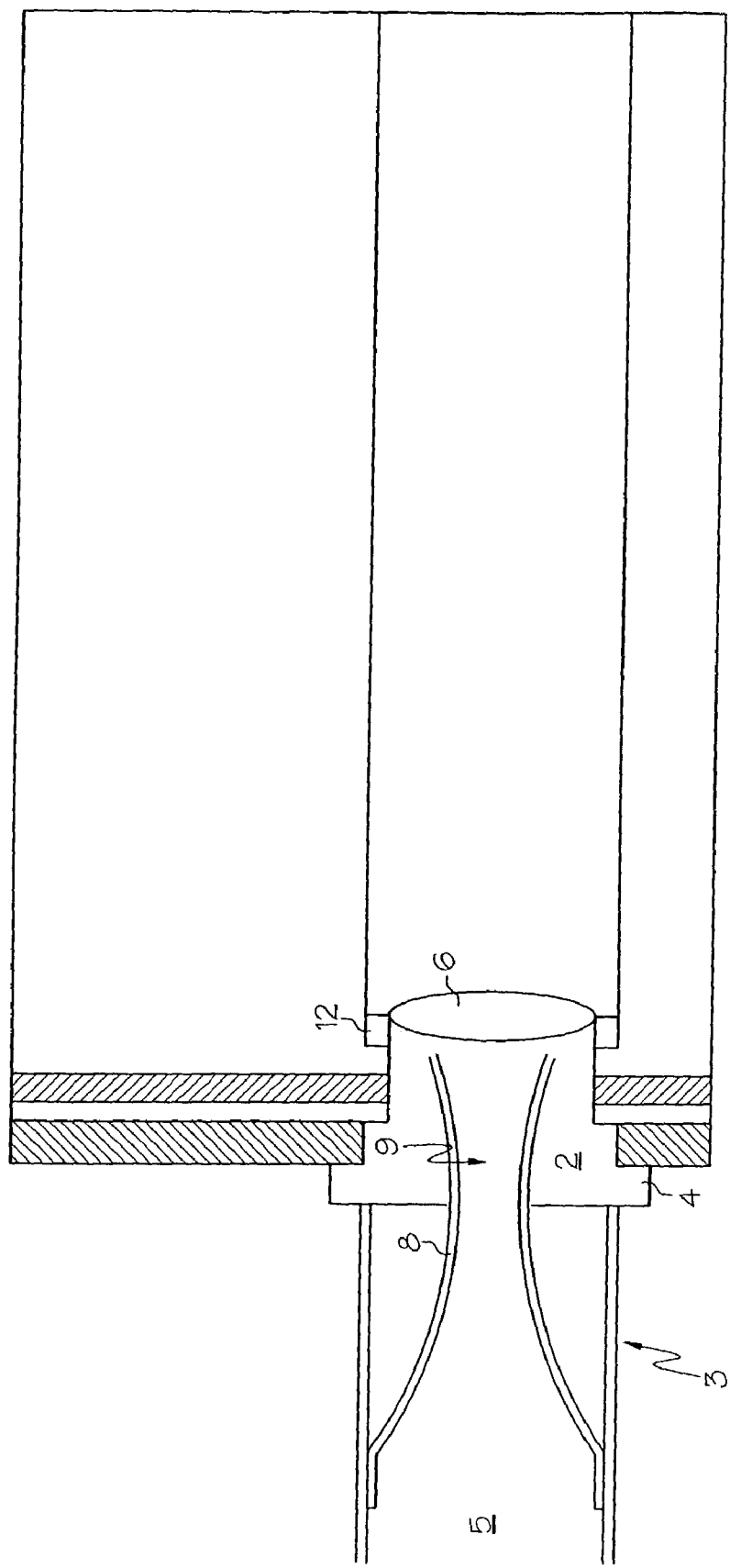
FIG. 1A is a schematic, cross-sectional view of a flow transfer component, at least a segment of which is extending into a fluid carrying duct in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help to improve understanding of the embodiments of the present invention.

DETAILED DESCRIPTION OF SOME EMBODIMENTS OF THE INVENTION

Referring initially to FIG. 1, a fluid carrying duct 3 incorporating a flow transfer component 2 in accordance with one embodiment of the present invention, is illustrated. The fluid carrying duct 3 comprises an electrically conductive flow passage 5 and the flow transfer component 2 comprises a first inlet/outlet 4, a second inlet/outlet 6, and an electrically resistive flow portion 8. The first inlet/outlet 4 is in fluid communication with the fluid carrying duct 5 and the first inlet/outlet 4 can be dimensioned so that it complements the fluid carrying duct 5. The second inlet/outlet 6, which is positioned on an opposite side of the flow transfer component 2 from the first inlet/outlet 4, is dimensioned so as to complement a fuel cell port 12.

The electrically resistive flow portion 8 can comprise a venturi shaped flowpath. By "venturi shaped" we mean that the walls of the electrically resistive flow portion 8 form a short straight pipe section positioned between two tapered or constricting sections, which are at opposite ends of the electrically resistive flow portion 8. In the present embodiment, at least a segment of the electrically resistive flow portion 8 is positioned between the first inlet/outlet 4 and the second inlet/outlet 6. Also in the present embodiment, at least a segment of the electrically resistive flow portion 8 extends into the fluid carrying duct 3 and defines a flowpath length sufficient to present a substantial electrical resistance across a volume defined by the electrically resistive flow portion 8. By "substantial electrical resistance" we mean an electrical resistance that is sufficient to electrically isolate a non-dielectric fluid coolant flowing through the electrically resistive flow portion 8 from conducting fault or shunt currents, which can lead to hazardous situations or component damage within the fuel cell system. The isolation resistance provided by the present invention achieves standard EV safety requirements for fuel cell stacks of 500 Ohms/Volt with degradation to 100 Ohms/Volt. In addition, the flow transfer component 2 effectively supports other electrical isolating features which can be designed into a liquid cooled fuel cell stack, i.e., active isolation and passive isolation, thereby reducing the dependence on these additional means of creating isolation resistance.

In accordance with its venturi shape, at least a segment of the electrically resistive flow portion 8 can comprise a reduced cross-sectional portion 9 between the first inlet/outlet 4 and the second inlet/outlet 6. Ordinarily, fluid flowing through a constriction in a flowpath causes a drop in fluid pressure. The electrically resistive flow portion 8 can be configured, however, to minimize a drop in pressure of a fluid coolant passing through the reduced cross-sectional portion 9. The flow transfer component 2 produces pressure drop results which are about 10 times better than a flow transfer component comprising an abrupt reduction in cross-sectional area, such as an inlay without a venturi flowpath or tapered sidewalls leading into a "thin tube" section. Consequently, the present invention provides a system that inherently limits fault or shunt currents by achieving high isolation resistances through the formation of a long resistance path with a small cross-sectional area.

The resistance of a fluid coolant traveling within the flow transfer component 2 of the present invention can be calculated using the following equation:

$$R = \int_0^L \frac{\rho}{A(x)} dx$$

where R is the resistance of a homologous conductor, L is the length of the electrically resistive flow portion 8, $\rho$ is the resistivity of the fluid (i.e., coolant) traveling within the electrically resistive flow portion 8, and A(x) is the cross-sectional area of the reduced cross-sectional portion 9 at location x from the starting point of the electrically resistive flow portion 8.

Because it is desirable to have high resistance in liquid cooled fuel cells in order to limit fault or shunt currents from being carried by the non-dielectric fluid coolant, the resistance R of the volume defined by the electrically resistive flow portion 8 of the present invention can be increased by selecting a fluid coolant with high resistivity $\rho$ (i.e., de-ionized water with glycol and corrosion inhibiting compounds), selecting a large length L, and selecting a small cross sectional area A. For example, isolation resistance of 100 Ohms/Volt are achievable with L equal to about 100 mm, $1/\rho$ equal to about 30 S/cm, and A equal to about 908 $mm^2$ at the first and second inlet/outlet to the electrically resistive flow portion and 254 $mm^2$ at the reduced inner diameter of the electrically resistive flow portion.

The flow transfer component 2 can comprise a non-conductive, polymeric material, such as a plastic. Optionally, the flow transfer component 2 can comprise a metallic, conductive material, such as a metal or metal alloy, which can be coated with a non-conductive material. Moreover, in accordance with the present invention, the flow transfer component 2 can optionally comprises an inlay. By "inlay" we mean a separate component that is positioned within a fuel cell manifold subsequent the initial formation of the manifold, such that the inlay is not integrally cast with the manifold. The inlay comprises the venturi shaped flowpath described herein and can comprise a non-conductive, polymeric material, such as a plastic. Optionally, the inlay can comprise a metallic, conductive material, such as a metal or metal alloy, which can be coated with a non-conductive material. In accordance with the instant embodiment, at least a segment of the inlay can extend into the fluid carrying duct 3, and comprises a reduced cross-sectional area portion 9 between the first inlet/outlet 4 and the second inlet/outlet 6. Moreover, the inlay can be configured to minimize a drop in pressure of a fluid coolant passing through the reduced cross-sectional portion 9.

The electrically resistive flow portion 8 can define a substantially linear flowpath (see FIG. 1A). Alternatively, as illustrated in FIG. 1B, the electrically resistive flow portion 8 can define an angular flowpath, which includes an angled section that is about 90°.

Referring now to FIG. 2, in accordance with another embodiment of the present invention, a fuel cell stack incorporating at least one flow transfer component 2 is illustrated in part. The fuel cell stack (not shown) comprises at least one fuel cell port 12 and the flow transfer component 2. In this embodiment, the first inlet/outlet 4 is dimensioned so as to complement the fluid carrying duct 3, and the second inlet/outlet 6 is in fluid communication with the fuel cell port 12. Moreover, the second inlet/outlet 6 can be dimensioned so as to complement the fuel cell port 12.

At least a segment of the electrically resistive flow portion 8 is positioned between the first inlet/outlet 4 and the second inlet/outlet 6, and at least a segment of the electrically resistive flow portion 8 extends into the fuel cell stack via the fuel cell port 12. The electrically resistive flow portion 8 defines a flowpath length sufficient to present a substantial electrical resistance across a volume defined by the electrically resistive flow portion 8.

Also in accordance with the present embodiment, the fuel cell stack comprises a plurality of fuel cells. The fuel cell port 12 is in fluid communication with the plurality of fuel cells and each fuel cell is configured to react fuel with oxygen to generate an electric current and at least one reaction product. Each fuel cell can comprise an anode flowpath configured to route the fuel through at least a portion of each fuel cell. The anode is in fluid communication with the anode flowpath, upon which a catalytic reaction with the fuel is configured to take place. In addition, each fuel cell comprises a cathode flowpath configured to route oxygen through at least a portion of each fuel cell. The cathode is in fluid communication with the cathode flowpath and a catalytic reaction with the oxygen is configured to take place on the cathode. Moreover, a membrane is disposed between the anode and the cathode, such that electrolyte communication is established therebetween during operation of each fuel cell. The flow transfer component 2 can be fluidly decoupled from the anode flowpath and the cathode flowpath.

In accordance with the present invention, the fuel cell stack can comprise at least two fuel cell ports 12, one fuel cell port 12 positioned at one terminal end of the fuel cell stack, and another fuel cell port 12 positioned at an opposite terminal end of the fuel cell stack. The fuel cell stack can further comprise at least two flow transfer components 2, each with an electrically resistive flow portion 8. One of the flow transfer components 2 can be in fluid communication with the fuel cell port 12 positioned at one terminal end of the fuel cell stack, while another flow transfer component 2 can be in fluid communication with the other fuel cell port 12 located at the opposite terminal end of the fuel cell stack, such that fluid flows into one flow transfer component 2, through the fuel cell stack to affect cooling, and exits through another flow transfer component 2. Consequently, the fuel cell stack can have flow transfer components 2 both leading into and exiting from the fuel cell stack, thus increasing the isolation resistance of the coolant traveling therethrough. It is further contemplated that multiple flow transfer components 2 in fluid communication with multiple fuel cell ports 12 can be presented in accordance with the present invention.

As in the embodiment illustrated in FIG. 1, in the instant embodiment, the electrically resistive flow portion 8 can comprise a venturi shaped flowpath. At least a segment of the electrically resistive flow portion 8 comprises a reduced cross-sectional portion 9 between the first inlet/outlet 4 and the second inlet/outlet 6, and the electrically resistive flow portion 8 can be configured to minimize a drop in pressure of a fluid coolant passing through the reduced cross-sectional portion 9 of the electrically resistive flow portion 8. Optionally, the flow transfer component 2 can comprise an inlay, which can comprise a venturi shaped flowpath. In the present embodiment, at least a segment of the inlay can extend into the fuel cell stack via the fuel cell port 12. As in the first embodiment, at least a segment of the inlay comprises a reduced cross-sectional portion 9 between the first inlet/outlet 4 and the second inlet/outlet 6, and the inlay can be configured to minimize a drop in pressure of a fluid coolant passing though the reduced cross-sectional portion 9 of the inlay.

Figure 3:
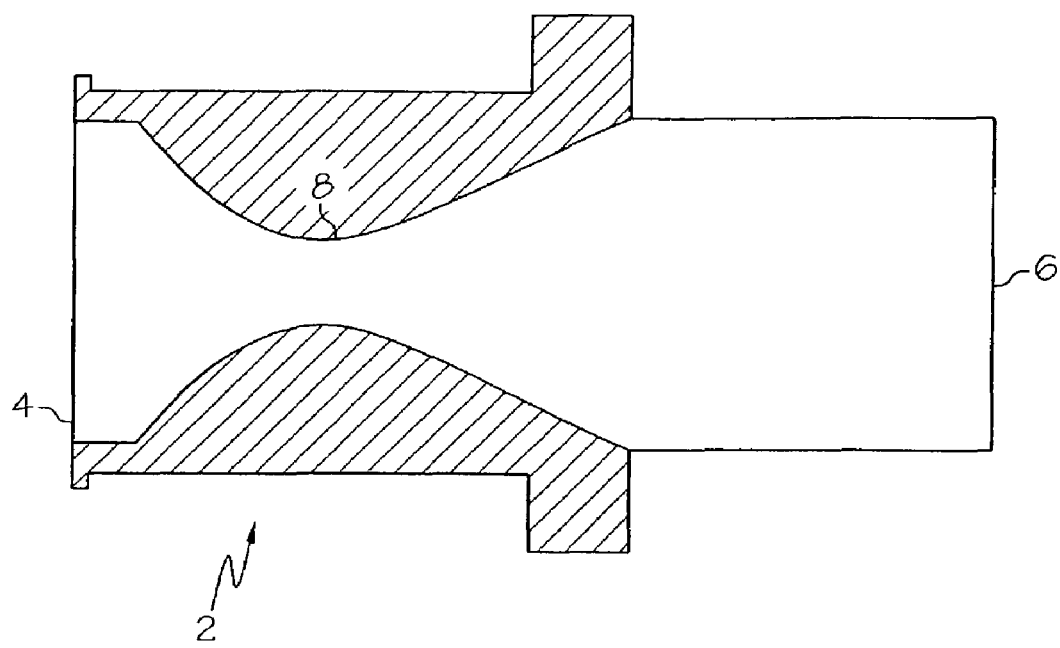
FIG. 3 is a schematic, cross-sectional view of a flow transfer component in accordance with one embodiment of the present invention.
Figure 4:
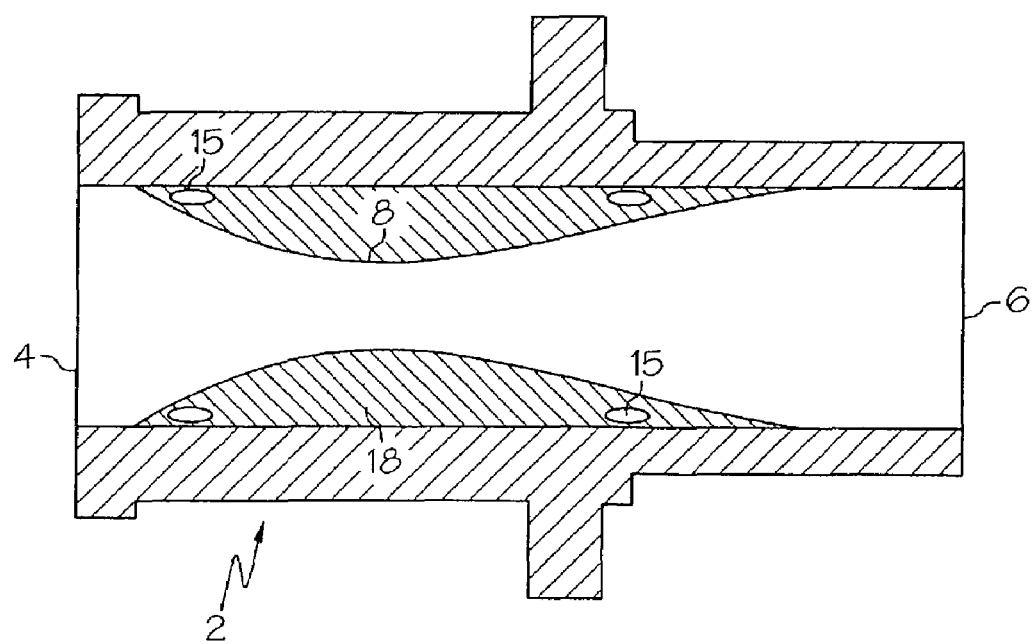
FIG. 4 is a schematic, cross-sectional view of an inlay in accordance with one embodiment of the present invention.

In accordance with still another embodiment of the present invention, a flow transfer component is provided. This embodiment is illustrated in FIGS. 3 and 4 and can comprise a first inlet/outlet 4, a second inlet/outlet 6, and an electrically resistive flow portion 8. The first inlet/outlet 4 is dimensioned so as to complement a fluid carrying duct (not shown) and the second inlet/outlet 6 is dimensioned so as to complement a fuel cell port (not shown). A least a segment of the electrically resistive flow portion 8 is positioned between the first inlet/outlet 4 and the second inlet/outlet 6, and at least a segment of the electrically resistive flow portion 8 can be configured so as to extend into a complementary fluid carrying duct. In accordance with yet another embodiment of the present invention, a flow transfer component 2 is provided having the features of the flow transfer component 2 described directly above, except that at least a segment of the electrically resistive flow portion 8 can be configured so as to extend into a complementary fuel cell port. In either embodiment, the electrically resistive flow portion 8 defines a flowpath length sufficient to present a substantial electrical resistance across a volume defined by the electrically resistive flow portion 8.

With reference specifically to the flow transfer component 2 illustrated in FIG. 3, the electrically resistive flow portion 8 can be integrally cast with the flow transfer component 2, such that the flow transfer component 2 and the electrically resistive flow portion 8 comprise the same material, such as, for example, a non-conductive, polymeric material, which can be a plastic, or a metallic, conductive material, such as a metal or metal alloy, which can be coated with a non-conductive material. Alternatively, as illustrated in FIG. 4, the electrically resistive flow portion 8 can comprise an inlay 18, which is positioned within the flow transfer component 2. The inlay 18 can comprise a material that is different from the flow transfer component 2. For example, the inlay 18 can comprise a polymeric, non-conductive material, and the flow transfer component 2 can comprise a metallic, conductive material. The inlay 18 can be fluidly sealed using one or more o-rings 15, which are shown in FIG. 4. The o-rings 15 serve to maintain fluid flow within the electrically resistive flow portion 8, formed by the inlay 18.

Figure 5:
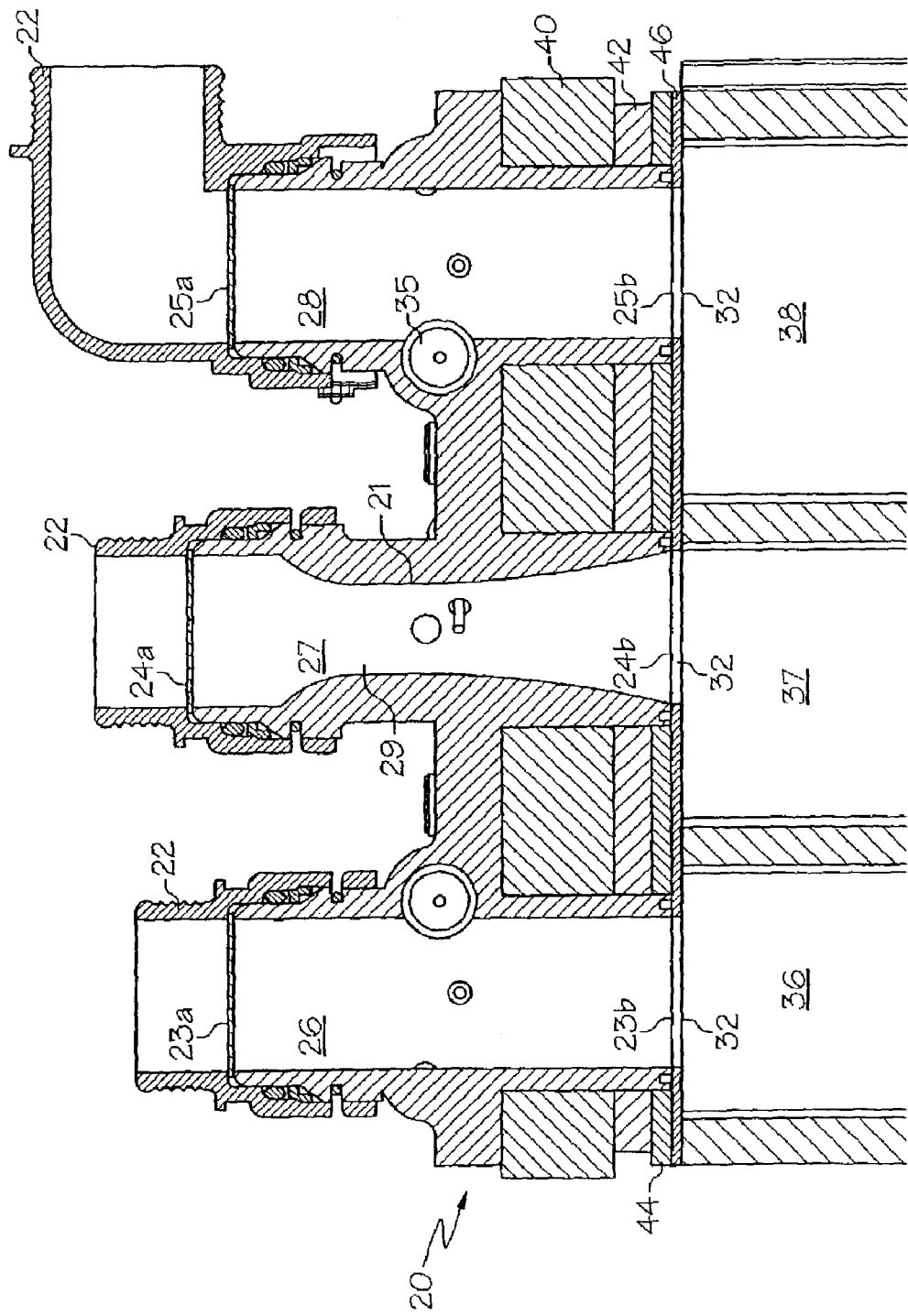
FIG. 5 is a schematic, cross-sectional view of a fuel cell manifold including an electrically resistive flow portion in accordance with one embodiment of the present invention.

Referring now to FIG. 5, in accordance with still yet another embodiment of the present invention, a fuel cell manifold 20 is illustrated that comprises a plurality of first inlet/outlets, a plurality of second inlet/outlets, and an electrically resistive flow portion 21. Each first inlet/outlet is dimensioned to enable securement of a fluid carrying duct 22, and each second inlet/outlet is dimensioned to enable securement of a fuel cell port 32. The electrically resistive flow portion 21 is positioned between at least one of the plurality of first inlet/outlets and at least one of the plurality of second inlet/outlets, and the electrically resistive flow portion 21 defines a flowpath length sufficient to present a substantial electrical resistance across a volume defined by the electrically resistive flow portion 21.

The manifold 20 can further comprise a flowpath defined between each first inlet/outlet and each second inlet/outlet. The plurality of first inlet/outlets can comprise at least one first anode media inlet/outlet 23a, at least one first cathode media inlet/outlet 25a, and at least one first coolant media inlet/outlet 24a. In addition, the plurality of second inlet/outlets can comprise at least one second anode media inlet/outlet 23b, at least one second cathode media inlet/outlet 25b, and at least one second coolant media inlet/outlet 24b. The second anode media inlet/outlet 23b can be dimensioned so as to complement an anode media channel 36, which is defined within a fuel cell stack. Likewise, the second cathode media inlet/outlet 25b can be dimensioned so as to complement a cathode media channel 38, which is also defined within a fuel cell stack. The second coolant media inlet/outlet 24b can also be dimensioned so as to complement a coolant media channel 37, which is defined within a fuel cell stack. At least one anode media flowpath 26 can be defined between the first anode media inlet/outlet 23a and the second anode media inlet/outlet 23b. In addition, at least one cathode media flowpath 28 can be defined between the first cathode media inlet/outlet 25a and the second cathode media inlet/outlet 25b. The electrically resistive flow portion 21 can be defined within a coolant media flowpath 27, which is defined between the first coolant media inlet/outlet 24a and the second coolant media inlet/outlet 24b.

The flowpaths 26-28 can serve to pass fluids through a variety of stack mechanical endplate parts. For example, as further illustrated in FIG. 5, the flowpaths 26-28 can be configured to pass fluids through a metallic stack outer endplate 40, a polymeric electrical isolation plate 42, an electrical stack terminal endplate 44, and a sealing plate 46. The flowpaths 26-28 of the present invention can also serve to pass fluids through a variety of other fuel cell stack mechanical components, which are not limited to the mechanical endplate parts shown in FIG. 5.

The electrically resistive flow portion 21 can comprise a venturi shaped flowpath, which is described herein, at least a segment of which can comprise a reduced cross-sectional portion 29 between the first inlet/outlet and the second inlet/outlet. The electrically resistive flow portion 21 is configured to minimize a drop in pressure of a fluid coolant passing through the reduced cross-sectional portion 29. The electrically resistive flow portion 21 can define a substantially linear flowpath or an angular flowpath, which defines an angled section that is about 90°. The manifold 20 can further comprise at least one due point sensor port 35 positioned adjacent the anode media flowpath 26 and at least one due point sensor port 35 positioned adjacent the cathode media flowpath 28.

The electrically resistive flow portion 21 can optionally comprise an inlay having a venturi shaped flowpath, such is defined herein. The manifold 20 can comprise a non-conductive, polymeric material, which can be a plastic. Optionally, the manifold 20 can comprise a metallic, conductive material, such as a metal or metal alloy, and the inlay can comprise a non-conductive, polymeric material, which can be a plastic. Optionally, the inlay can comprise a metallic, conductive material, such as a metal or metal alloy, which can be coated with a non-conductive material. In addition, if the manifold 20 is a metallic, conductive material, it can be coated with a non-conductive material. At least a segment of the inlay comprises a reduced cross-sectional portion between the first inlet/outlet and the second inlet/outlet, and the inlay can be configured to minimize a drop in pressure of a fluid coolant passing through the reduced cross-sectional portion of the inlay.

While the invention has been described by reference to certain embodiments, is should be understood that numerous changes could be made within the spirit and scope of the inventive concepts described. Accordingly, it is intended that the invention not be limited to the disclosed embodiments, but that is have the full scope permitted by the language of the following claims.

What is claimed is:

1. A fuel cell stack incorporating at least one flow transfer component wherein:
    said fuel cell stack comprises at least one fuel cell port; and
    said flow transfer component comprises:
        a first inlet/outlet, wherein said first inlet/outlet is dimensioned so as to complement a fluid carrying duct,
        a second inlet/outlet, wherein said second inlet/outlet is in fluid communication with said fuel cell port, and
        an electrically resistive flow portion, wherein:
            at least a segment of said electrically resistive flow portion is positioned between said first inlet/outlet and said second inlet/outlet,
            at least a segment of said electrically resistive flow portion extends into said fuel cell stack via said fuel cell port, and
            said electrically resistive flow portion defines a flowpath length sufficient to present a substantial electrical resistance across a volume defined by said electrically resistive flow portion.

2. The fuel cell stack of claim 1 wherein
    said fuel cell stack comprises a plurality of fuel cells,
    said fuel cell port is in fluid communication with said plurality of fuel cells, and
    each fuel cell is configured to react fuel with oxygen to generate an electric current and at least one reaction product, each fuel cell comprising:
        an anode flowpath configured to route said fuel through at least a portion of each fuel cell;
        an anode in fluid communication with said anode flowpath and upon which a catalytic reaction with said fuel is configured to take place;
        a cathode flowpath configured to route said oxygen through at least a portion of each fuel cell;
        a cathode in fluid communication with said cathode flowpath and upon which a catalytic reaction with said oxygen is configured to take place; and a membrane disposed between said anode and said cathode such that electrolyte communication is established therebetween during operation of each fuel cell.

3. The fuel cell stack of claim 2 wherein said flow transfer component is fluidly decoupled from said anode flowpath and said cathode flowpath.

4. The fuel cell stack of claim 1 wherein said second inlet/outlet is dimensioned so as to complement said fuel cell port.

5. The fuel cell stack of claim 1 further comprising at least two fuel call ports and at least two flow transfer components, wherein one said flow transfer component is in fluid communication with one said fuel cell port leading into said fuel cell stack, and wherein one said flow transfer component is in fluid communication with one said fuel cell port leading out from said fuel cell stack.

6. The fuel cell stack of claim 1 wherein said electrically resistive flow portion comprises a venturi shaped flowpath.

7. The fuel cell stack of claim 1 wherein at least a segment of said electrically resistive flow portion comprises a reduced cross-sectional portion between said first inlet/outlet and said second inlet/outlet.

8. The fuel cell stack of claim 7 wherein said electrically resistive flow portion is configured to minimize a drop in pressure of a fluid coolant passing through said reduced cross-sectional portion of said electrically resistive flow portion.

9. The fuel cell stack of claim 1 wherein said flow transfer component comprises an inlay.

10. The fuel cell stack of claim 9 wherein said inlay comprises a venturi shaped flowpath.

11. The fuel cell stack of claim 9 wherein at least a segment of said inlay extends into said fuel cell stack via said fuel cell port.

12. The fuel cell stack of claim 9 wherein a least a segment of said inlay comprises a reduced cross-sectional portion between said first inlet/outlet and said second inlet/outlet.

13. The fuel cell stack of claim 9 wherein said inlay is configured to minimize a drop in pressure of a fluid coolant passing through said reduced cross-sectional portion of said inlay.

14. The fuel cell stack of claim 1 wherein said electrically resistive flow portion defines a substantially linear flowpath.

15. The fuel cell stack of claim 1 wherein said electrically resistive flow portion defines an angular flowpath.

16. The fuel cell stack of claim 15 wherein said angular flowpath defines an angled section that is about 90°.

* * * * *